United States Patent Office
3,423,390
Patented Jan. 21, 1969

3,423,390
ACYLATED HEXAPEPTIDES RELATED
TO ELEDOISIN
Klaus Lukbe, Eberhard Schroder, and Georg Zollner,
Berlin, Germany, assignors to Schering A.G., Berlin,
Germany, a corporation of Germany
No Drawing. Filed May 13, 1966, Ser. No. 549,782
Claims priority, application Germany, Sept. 21, 1965,
Sch 37,756
U.S. Cl. 260—112.5  8 Claims
Int. Cl. C07c 103/52

ABSTRACT OF THE DISCLOSURE

Synthetic polypetides having hypotensive activity, bearing the C-terminal partial sequence of eledoisin of the formula R—L—Ala—L—Phe—R'—
Gly—L—Leu—L—Met—NH$_2$ wherein R is formyl, nicotinoyl, α-hydroxyisovaleryl, chloroacetyl, α-acetyl-L-Lys, α,ε-diacetyl-L-Lys or ε-aminocaproyl and R' is L-Ileu or L-Val.

This invention relates to novel synthetic polypeptides. In another respect it relates to a new process for the preparation of synthetic polypeptides having hypotensive activity.

Eledoisin, which is fully depicted as L-pyroglutamyl-L-prolyl-L-seryl-L-lysyl-L-asparaginyl-L-alanyl-L-phenylalanyl-L-isoleucyl-glycyl-L-leucyl-L-methioninamide, is a naturally occurring undecapeptide having vasodilating and hypotensive activity. Analogs of eledoisin, including some partially modified eledoisin-like amino acid sequence, have been described in the literature. Some of these analogs have demonstrated an activity similar to eledoisin, and some are reported as more active than the natural undecapeptide.

From the French Patent No. 1,329,840, it is known that the heptapeptide L-asparagyl-L-alanyl-L-phenylalanyl-L-isoleucyl-glycyl-L-leucyl-L-methioninamide, whose free carboxyl group on the asparagyl group can also be modified by formation of amide, has a marked and especially dilating action on the blood vessel system.

As a result of the action of trypsin or snake poison enzymes on plasma proteins there is formed in the tissue the hormone bradykinin, a nonapeptide of the formula L-arginyl-L-prolyl-L-prolyl-glycyl-L-phenylalanyl-L-seryl-L-prolyl-L-phenylalanyl-L-arginine; it has, among others, a hypotensive action, and potentiates considerably the coronary flow in isolated hearts of different animal species.

We have found that a particular modification of the C-terminal partial sequence of eledoisin causes a markedly more pronounced hypotensive activity for the resulting novel polypeptides than is attributed to other known eledoisin-like polypeptides. Even more striking is their hypotensive activity as compared to bradykinin. Specifically, in one group of our novel polypeptides, having the partial sequence of eledoisin, the asparaginic acid is replaced by formic acid or any functionally substituted organic acid group. In another novel group the substituted organic acid analogs are further modified by replacement of the L-isoleucine moiety by an L-valine moiety.

The novel polypeptides of this invention have the following general formula:

R-L-alanyl- L - phenylalanyl - R$^1$ - glycyl - L - leucyl-L-methioninamide wherein R is formyl, nicotinyl, α-hydroxyisovaleryl, chloroacetyl, α-acetyl-L-lysyl, α,ε-diacetyl-L-lysyl, or ε-aminocaproyl; and R$^1$ is L-isoleucyl or L-valyl.

The table shows the biological activity of certain of the peptides of this invention. The dogs were anesthetized with urethane (1.2 g./kg. of body weight). The peptides were administered intravenously.

TABLE I.— RELATIVE ACTION OF SYNTHETIC POLYPEPTIDES ON BLOOD PRESSURE IN THE DOG

| Substance R-Ala-Phe-Ileu-Gly-Leu-Met-NH$_2$ | Relative hypotensive activity referred to— | |
|---|---|---|
|  | Eledoisin=1 | Bradykinin=1 |
| R=Formyl | 2 | 20 |
| R=Chloroacetyl | 2 | 20 |
| R=α-Hydroxyisovaleryl | 2 | 20 |
| R=ε-Aminocaproyl | 2.5 | 25 |
| R=Nicotinyl | 1.5 | 15 |
| R=α-Monoacetyl-lysyl | 3.5 | 35 |

The more pronounced action of these novel compounds disclosed herein is surprising because it cannot be explained by the prevention of enzymatic decomposition with aminopeptidases, which proves only the eledoisin-like action of the diacetyllysyl derivative and the low activity of the caproyl and capryl compounds (30% and 10% of the action of eledoisin), which can also not be decomposed with aminopeptidases.

Also, many of the compounds prepared according to this invention differ from the products known hitherto because they are easier to prepare, because, for example, organic acids substituted at random are sometimes more easily accessible than amino acids.

For the synthesis of the novel compounds of the partial eledoisin sequence described above (R$^1$=L-isoleucyl), we start with H-Ala-Phe-OMe, and proceed to the desired heptapeptides, as described in Examples 1 to 7 below.

For the synthesis of the remainder of the novel compounds described previously (R$^1$=L-valyl), we also start with H-Ala-Phe-OMe, and proceed to the L-valyl congeners of the desired polypeptides.

H-Ala-Phe-OMe is treated with a suitable organic acid to produce typically, formyl-Ala-Phe-OMe.

This intermediate, which is preferentially converted to the azide via the hydrazide and t-butyl nitrite is then coupled with the appropriate methioninamide (H-Ileu-Gly-Leu-Met-NH$_2$ or H-Val-Gly-Leu-Met-NH$_2$) to yield the protected polypeptide. Removal of the protecting groups yield the desired products.

Example 1.—Preparation of formyl-Ala-Phe-Ileu-Gly-Leu-Met-NH$_2$

Formyl-Ala-Phe-OMe is obtained using the standard mixed anhydride procedure [M.P. 115–117°] (from ethanol/petroleum ether), [α]$_D$=−10.8° (c.=0.8; DMF) and is converted to the hydrazide with a three-fold excess of hydrazine hydrate. The hydrazide has a melting point of 207–208° C. (from DMF/petroleum ether), [α]$_D$=49.9° (c.=0.5; glacial acetic acid).

Conversion of 0.3 g. of the hydrazide to the azide with tert.-butyl nitrite in hydrogen chloride/tetrahydrofuran and subsequent reaction with 0.6 g. H-Ileu-Gly-Leu-Met-NH$_2$. HCl yields 0.5 g. of the desired compound, M.P. 267–268° C. [α]$_D$=42.0° C. (c.=0.5; DMF).

Example 2.—Preparation of nicotinoyl-Ala-Phe-Ileu-Gly-Leu-Met-NH$_2$

A mixture of 3.2 g. of nicotinic acid chloride and 5.7 g. of H-Ala-Phe-OMe. HCl in chloroform is treated with 8.4 cc. of triethylamine to produce 5.6 g. of Nicotinoyl-Ala-Phe-OMe, melting at 161–162° C. (from ethanol/petroleum ether), [α]$_D$=32.0° (c.=0.5; glacial acetic acid).

Hydrazinolysis with four times the quantity of hydrazine hydrate yielded the hydrazide, M.P. 209–211° C.

$[\alpha]_D = -16.6°$ (c.=0.5; glacial acetic acid), which is converted to the azide as in Example 1 and allowed to react with H-Ileu-Gly-Leu-Met-NH₂·HCl to give the nicotinoyl hexapeptide M.P. 272–274° C. $[\alpha]_D = 27.5°$ (c.=0.5; DMF).

Example 3.—Preparation of α-hydroxyisovaleryl-Ala-Phe-Ileu-Gly-Leu-Met-NH₂

From 0.3 g. of L-α-hydroxyisovaleric acid hydrazide and 0.3 cc. of tert.-butyl nitrite in 2.9 cc. of a 1.5 N solution of hydrogen chloride in tetrahydrofuran is formed the azide which, following neutralization with triethylamine, is reacted with 1.5 g. of H-Ala-Phe-Ileu-Gly-Leu-Met-NH₂·HCl and 0.3 cc. triethylamine. The yield of acylated peptide is 1.3 g. M.P. 267–270° C. $[\alpha]_D = -38.7°$ (c.=0.5; DMF).

Example 4.—Preparation of chloroacetyl-Ala-Phe-Ileu-Gly-Leu-Met-NH₂

0.2 g. of monochloracetic acid is converted into the mixed anhydride using 0.3 cc. of triethylamine and 0.2 cc. of ethyl chloroformate and this is coupled with 1.4 g. of H-Ala-Phe-Ileu-Gly-Leu-Met-NH₂ to produce 1.2 g. of product, M.P. 238–242° C. $[\alpha]_D = 36.40$ (c.=0.5; DMF).

Example 5.—Preparation of α-acetyl-L-lysyl-L-Ala-L-Phe-L-Ileu-Gly-L-Leu-L-Met-NH₂

(a) Ac-L-Lys(BOC)-NHNH₂.—4.0 g. (15.4 mmoles) of H-L-Lys(BOC)-OMe is acetylated with 2.8 g. (15.4 mmoles) of p-nitrophenyl acetate. The hydrazide is produced from the methyl ester which is obtained as an oil [3.9 g. (84.1%); $[\alpha]_D^{22} = 18.7°$ (c.=1.5; pyridine)] by hydrazinolysis with 2.5 times the required amount of hydrazine hydrate. Yield: 2.1 g. (55%), M.P. 123–125° C. (from ethyl acetate).

(b) Ac-L-Lys(BOC)-L-Ala-L-Phe-L-Ileu-Gly-L-Leu-L-Met-NH₂. — 1.5 g. (5 mmoles) of Ac-L-Lys(BOC)-NHNH₂ is converted into the azide with 0.5 cc. (5.2 mmoles) of tert.-butyl nitrite and the azide coupled with 3.2 g. (5 mmoles) of H-L-Ala-L-Phe-L-Ileu-Gly-L-Leu-L-Met-NH₂. Following thorough washing of the solid compound and reprecipitation from DMF/aqueous citric acid the yield is 2.8 g. (61.5%); M.P. 249–254° C. $[\alpha]_D^{22} = 40.8°$ (c.=0.5; glacial acetic acid).

(c) Ac-L-Lys-L-Ala-L-Phe-L-Ileu-Gly-L-Leu-L-Met-NH₂ is obtained in a quantitative yield by removal of the protecting group with HCl/glacial acetic acid from the compound described in Example 5b, M.P. 225–245° C. $[\alpha]_D^{22} = 42.5°$ (c.=0.5; glacial acetic acid).

Example 6.—Preparation of Ac-L-Lys(Ac)-L-Ala-L-Phe-L-Ileu-Gly-L-Leu-L-Met-NH₂

(a) BOC-L-Lys-(Ac)-OH.—2.3 g. (12 mmoles) of H-L-Lys(Ac)-OH are dissolved in 1:1 dioxane/water and reacted in the presence of 1.5 g. (36 mmoles) of magnesium oxide with 3.4 g. (14.2 mmoles) of tert.-butyloxycarbonyl-p-nitrophenyl ester. The yield of title compound is 1.31 g. (38%). M.P. 137–138° C. (from ethyl acetate-petroleum ether); $[\alpha]_D^{22} = 10.1°$ (c.=0.5; glacial acetic acid).

(b) BOC-L-Lys-(Ac)-OPhNO₂.—1.0 g. (3.4 mmoles) of BOC-L-Lys(Ac)-OH is esterified with 0.6 g. (4.5 mmoles) of p-nitrophenol using the carbodiimide method. The yield of ester is 1.3 g. (92%); M.P. 96–98° C. (from ethyl acetate-petroleum ether); $[\alpha]_D^{22} = 24.3°$ (c.=0.5; ethanol).

(c) BOC-L-Lys-(Ac)-L-Ala-L-Phe-L-Ileu-Gly-L-Leu-L-Met-NH₂. — 1.2 g. (3 mmoles) of BOC-Lys(Ac)-OPhNO₂ is reacted with 2.0 g. (3 mmoles) of H-L-Ala-L-Phe-L-Ileu-Gly-L-Leu-L-Met-NH₂ in DMF for 3 days at 40° C. Following usual procedures there is obtained 1.3 g. (48%) of peptide, M.P. 239–260° C. $[\alpha]_D^{22} = 44.0°$ (c.=0.5; glacial acetic acid).

(d) H-L-Lys(Ac)-L-Ala-L-Phe-L-Ileu-Gly-L-Leu-L-Met-NH₂ is obtained from the protected compound by cleavage of the protective group with HCl/glacial acetic acid, M.P. approx. 230° C. dec.; $[\alpha]_D^{22} = 27.0°$ (c.=0.5; glacial acetic acid).

$C_{39}H_{65}N_9O_8S \cdot 1.6HCl \cdot 3H_2O$ (932.45)

(e) Ac-L-Lys(Ac)-L-Ala-L-Phe-L-Ileu-Gly-L-Leu-L-Met-NH₂.—800 mg. (0.9 mmole) of α-acetyl-lysine-heptapeptide amide hydrochloride is, following liberation with 0.13 cc. of triethylamine in DMF, reacted as usual with 360 mg. (2 mmoles) of p-nitrophenyl acetate. Yield of diacetyl peptide is 640 mg. 80%, M.P. 260–266° C., $[\alpha]_D^{22} = 44.8°$ (c.=0.5; glacial acetic acid).

Example 7.—Preparation of H-ε-aminocaproyl-L-Ala-L-Phe-L-Ileu-Gly-L-Leu-L-Met-NH₂

(a) ε-BOC-aminocaproic acid (BOC-ε-Acap-OH) ε-aminocaproic acid and tert.-butyloxycarbonyl-p-nitrophenyl ester yield, according to common methods, 77% of an oil which crystallized, M.P. 30–31° C.

(b) BOC-ε-Acap-L-Ala-L-Phe-L-Ileu-Gly-L-Leu-L-Met-NH₂.—Using the mixed anhydride method there is isolated from 1.4 g. (6 mmoles) of BOC-ε-aminocaproic acid and 3.9 g. (6 mmoles) of H-L-Ala-L-Phe-L-Ileu-Gly-L-Leu-L-Met-NH₂. 4.1 g. (78%) of produce, M.P. 247–248° C. $[\alpha]_D^{22} = 33.6°$ (c.=0.6, DMF).

(c) H-ε-Acap-L-Ala-L-Phe-L-Ileu-Gly-L-Leu-L-Met-NH₂·HCl.—

By cleavage of the protective group with HCl/glacial acetic acid the unblocked peptide is obtained in a quantitative yield. M.P. 221–230° C. $[\alpha]_D^{22} = 35°$ C. (c.=0.5; DMF).

What is claimed is:

1. A synthetic peptide having the general formula: R-L-alanyl-L-phenylalanyl-L-isoleucyl-glycyl-L-leucyl-L-methioninamide wherein R is formyl, nicotinoyl, L-α-hydroxyisovaleryl, chloroacetyl, α-acetyl-L-lysyl, α,ε-diacetyl-L-lysyl, or ε-aminocaproyl.

2. A synthetic peptide according to claim 1 wherein R is formyl.

3. A synthetic peptide according to claim 1 wherein R is nicotinoyl.

4. A synthetic peptide according to claim 1 wherein R is L-α-hydroxyisovaleryl.

5. A synthetic peptide according to claim 1 wherein R is chloroacetyl.

6. A synthetic peptide according to claim 1 wherein R is α-acetyl-L-lysyl.

7. A synthetic peptide according to claim 1 wherein R is α,ε-diacetyl-L-lysyl.

8. A synthetic peptide according to claim 1 wherein R is ε-aminocaproyl.

References Cited

UNITED STATES PATENTS

| | | | |
|---|---|---|---|
| 3,268,502 | 8/1966 | Lubke et al. | 260—112.5 |
| 3,299,035 | 1/1967 | Boissonnas et al. | 260—112.5 |
| 3,300,469 | 1/1967 | Bernardi et al. | 260—112.5 |
| 3,341,510 | 9/1967 | Chillemi | 260—112.5 |

OTHER REFERENCES

Bernardi et al., Experientia 20, 306–309 (1964).
Bernardi et al., Experientia 21, 695–697 (1965).
Lubke et al., Ann. 692, 237–240 (1966).
Sturmer et al., Experientia 20, 303–306 (1964).

LEWIS GOTTS, *Primary Examiner.*

M. M. KASSENOFF, *Assistant Examiner.*

U.S. Cl. X.R.

260—479, 561, 999